United States Patent
Chen (10) Patent No.: US 11,468,094 B2
(45) Date of Patent: Oct. 11, 2022

(54) COMPUTER SYSTEM AND FAULT TOLERANCE PROCESSING METHOD THEREOF OF IMAGE FILE

(71) Applicant: Acer Incorporated, New Taipei (TW)

(72) Inventor: Kuan-Ju Chen, New Taipei (TW)

(73) Assignee: Acer Incorporated, New Taipei (TW)

(*) Notice: Subject to any disclaimer, the term of this patent is extended or adjusted under 35 U.S.C. 154(b) by 806 days.

(21) Appl. No.: 16/252,742

(22) Filed: Jan. 21, 2019

(65) Prior Publication Data
US 2020/0026715 A1    Jan. 23, 2020

(30) Foreign Application Priority Data

Jul. 17, 2018  (TW) .................................. 107124640
Aug. 27, 2018  (TW) .................................. 107129839

(51) Int. Cl.
*G06F 16/27* (2019.01)
*G06F 11/14* (2006.01)

(52) U.S. Cl.
CPC ........ *G06F 16/278* (2019.01); *G06F 11/1469* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 6,542,975 B1* | 4/2003 | Evers | G06F 11/1458 711/112 |
| 7,143,433 B1* | 11/2006 | Duan | H04N 21/23103 725/115 |
| 2003/0126247 A1* | 7/2003 | Strasser | G06F 11/1458 707/999.2 |
| 2008/0120459 A1* | 5/2008 | Kaneda | G06F 11/1451 711/112 |
| 2018/0285353 A1* | 10/2018 | Ramohalli Gopala Rao | G06F 9/45558 |
| 2019/0179918 A1* | 6/2019 | Singh | G06F 9/45558 |
| 2019/0278863 A1* | 9/2019 | Modai | G06F 16/24568 |

* cited by examiner

*Primary Examiner* — Eddy Cheung
(74) *Attorney, Agent, or Firm* — JCIPRNET (57) ABSTRACT

A computer system and a fault tolerance processing method thereof of image file are provided. In the method, whether to segment the image file is determined. The image file is segmented into multiple image segmented files sequentially, and a segmenting process is recorded in response to determining to segment the image file. The segmenting process relates to a number of a last segmented file. Each time the image file is segmented once, the number of the last segmented file is accumulated. Segmenting the image file is continued according to the segmenting process in response to a segmenting exception situation. On the other hand, the deployment for the image file is performed in conjunction with a record of the current progress during the deployment, so that the deployment also can be continued in response to an interruption of the deployment. Accordingly, efficiency and successful rate can be improved.

18 Claims, 6 Drawing Sheets

COMPUTER SYSTEM AND FAULT TOLERANCE PROCESSING METHOD THEREOF OF IMAGE FILE

CROSS-REFERENCE TO RELATED APPLICATION

This application claims the priority benefit of Taiwan application Ser. No. 107124640, filed on Jul. 17, 2018 and Taiwan application Ser. No. 107129839, filed on Aug. 27, 2018. The entirety of each of the above-mentioned patent applications is hereby incorporated by reference herein and made a part of this specification.

BACKGROUND OF THE DISCLOSURE

1. Field of the Disclosure

The present disclosure generally relates to a processing method of image files, in particular, to a computer system and a fault tolerance processing method thereof of image file.

2. Description of Related Art

Computer systems (such as desktop computers, laptops, all-in-ones (AIOs), etc.) are one of tools usually used by people at work, entertainment, leisure and other things of daily life. In usual use of common users, the computer systems may inevitably encounter an exception (such as system failure, update failure, driver conflict, malware attack, etc.). Some users may try to restore an operating system (OS), a disk partition or files in their computer systems, so that the computer systems can be recovered to a normal state. However, the restoring operation of the computer system may not always be successful. Sometimes, during the restoring operation, OS problem, hardware related problem (such as power interrupt, losing power from battery, etc.), or any improper operation of users may occur. Because there is no easy solution for recovery failure, the users would send their computer systems to a maintenance center after they encountered the exception during the restoring operation. However, it is complicated to fix the recovery failure, and it may result in an expensive charge for maintenance fee. Even the maintenance center may return the computer system without repair when the engineer has no idea to fix the computer system.

On the other hand, an original equipment manufacturer (OEM) would provide an image file including not only OS and hotfix thereof but also a customized configuration, applications and drivers before a computer product (such as a laptop) is shipped. Although a deployment time for the image file is related to the performance of the computer product, a large number of the recovery files may take long time for the deployment. In addition, if an error occurs during the deployment of the image file, the whole deployment procedure would be restarted again. It wastes time and is inconvenient.

SUMMARY OF THE DISCLOSURE

Accordingly, the present disclosure is directed to a computer system and a fault tolerance processing method thereof of image file. After the image is segmented into multiple image segmented files, it can be confirmed that the recovery and deployment of the image segmented files can be restarted quickly in response to an exception occurring, so as to improve efficiency and the successful rate for image file recovery.

The fault tolerance processing method thereof of image file of the present disclosure includes the following steps. Whether to segment image file is determined. If segmenting the image file is determined, the image file would be segmented into multiple image segmented files sequentially, and a segmenting process is recorded. The segmenting process is related to a number of a last segmented file. Each time the image file is segmented once, the number of the last segmented file is accumulated. Then, to segment the image file is continued according to the segmenting process in response to a segmenting exception situation.

The computer system of the present disclosure includes a memory and a processor. The memory records image file. The processor is coupled to the memory. The processor is configured to determine whether to segment the image file, segment the image file into multiple image segmented files sequentially and record a segmenting process in response to determining to segment the image file, and continue to segment the image file according to the segmenting process in response to a segmenting exception situation. The segmenting process is related to a number of a last segmented file. Each time the image file is segmented once, the number of the last segmented file is accumulated.

Base on the above, by implementing the computer system and the fault tolerance processing method thereof of image file of the present disclosure, before restoring the image file, one image file would be segmented into multiple image segmented files, or more image files are the image segmented files is confirmed. The computer system would record the segmenting process while the image file being segmented, so that the segmenting operation can be continued after a segmenting exception situation can be continued. On the other hand, these image segmented files are restored sequentially. If any restoring exception situation occurs, the computer system can continue to restore the image segmented files. When comparing with restoring single image file, the fault tolerance mechanism of the embodiment of the present disclosure would not need to restart the whole recovery operation in response to any exception situation. Therefore, the efficiency and the successful rate for image file recovery can be improved significantly, and any common people can handle the exception situation easily. On the other hand, regarding a deployment of the image file, a current progress would be recorded in a log file. In response to any error or interruption of the deployment occurring, the deployment of the image file can be started from a part of the image file, which encountered the error or the interruption, based on the content of the log file. Accordingly, the average deployment time can be reduced, and the convenience can be improved.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
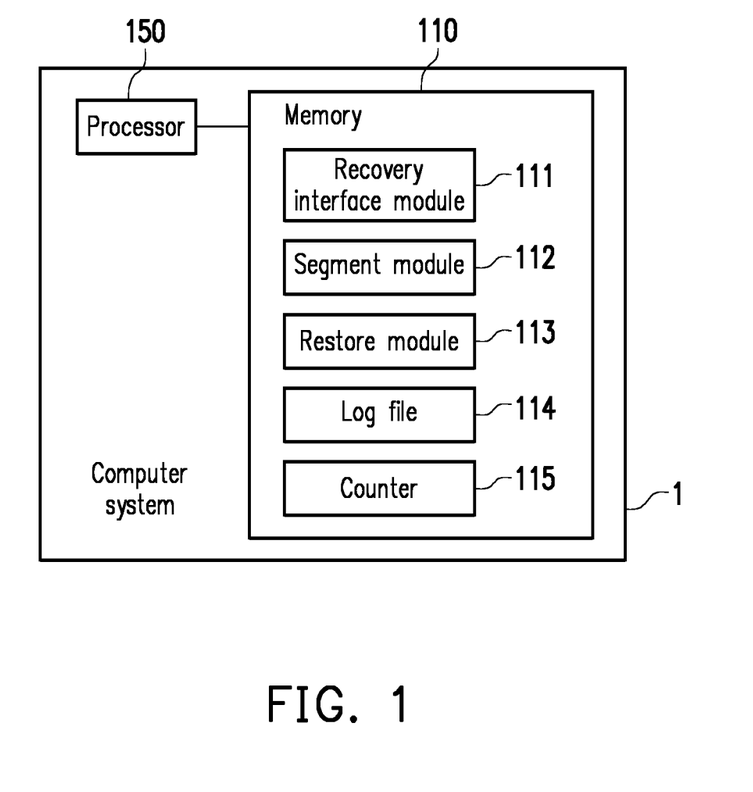
FIG. 1 is a block diagram illustrating a computer system according to an embodiment of the present disclosure.

FIG. 1 is a block diagram illustrating a computer system according to an embodiment of the present disclosure. Referring to FIG. 1, the computer system 1 includes, not only but not limited to, a memory 110 and a processor 150. The computer system 1 could be a desktop computer, a laptop, a server, an all-in-on (AIO), a smart phone, a tablet computer, or other electronic apparatus.

The memory 110 could be any fixed type or movable type random access memory (RAM), a read-only memory (ROM), a flash memory or a memory of a combination of similar elements or the foregoing elements. The memory 110 is used for storing buffered or permanent data, software modules (such as a recovery interface module 111, a segment module 112, a restore module 113, a counter 115, etc.), a log file 114, one or more image files, one or more image segmented files, segmenting process, restoring process, file segmenting information, current progress and the like, and detailed contents are explained in the following embodiments.

The processor 150 is coupled with the memory 110. The processor 150 can be a central processing unit (CPU) or other microprocessors which are programmable and can be in a general purpose or a special purpose, a digital signal processor (DSP), a programmable controller, an application-specific integrated circuit (ASIC) or a combination of other similar elements or the foregoing elements. In the embodiment of the present disclosure, the processor 150 is used for performing all operations of the computer system 1, and can load and execute various software modules, files and data which are recorded in the memory 110.

In order to understand the operation process of the embodiment of the present disclosure, multiple embodiments are described to illustrate a processing procedure of the computer system 1 for image file in the embodiment of the present disclosure in detail below. Hereinafter, the method of the embodiment of the present disclosure is illustrated below with reference to various elements and modules in the computer system 1. Various procedures of the method can be adjusted according to actual implementation situations, but the embodiments is not limited thereto.

Figure 2:
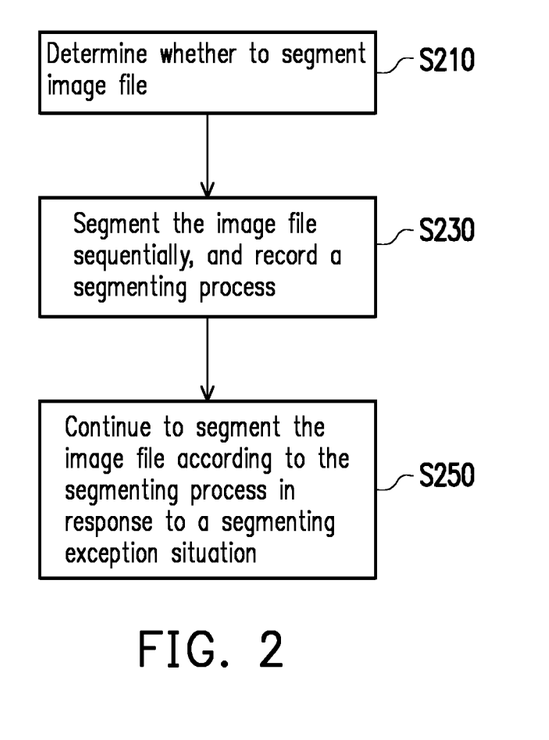
FIG. 2 is a flow chart of a fault tolerance processing method-segmenting phase according to an embodiment of the present disclosure.

FIG. 2 is a flow chart of a fault tolerance processing method-segmenting phase according to an embodiment of the present disclosure. Referring to FIG. 2, the recovery interface 11 may present a recovery interface through a display (such a liquid crystal display (LCD), light-emitting diode (LED) display, etc.) of the computer system 1. The recovery interface may be, for example, integrated in the recovery function of an operating system (OS) (such as Windows, MAC OS, Linux, etc.) or belonged to an independent application, and provides functions such as reception of starting or aborting operation of recovery procedure, or information display. The recovery interface module 111 may receive starting operation for the recovery procedure through an input device (such as a keyboard, a mouse, a touch panel, etc.), and the recovery interface module 111 accordingly triggers the tolerance mechanism of the embodiment of the present disclosure.

The tolerance mechanism may access or transmit messages to a recovery partition in the memory 110 in conjunction with the recovery function of the OS. Specifically, the processor 150 may copy a bootloader and other files related system boot (such as boot configuration data (BCD) file, boot manger, etc.) to the recovery partition (i.e., the partition used for storing image file for recovery) of the memory 110, instruct to enter this recovery partition after reboot, and record the storing path of these files related system boot. It should be noticed that, in other embodiments, these files related system boot might be stored in other partitions of the memory 110 if these files can be accessible and their storing path can be recorded.

Then, the segment module 112 may check whether the type of the image file for recovery is a single image file, to determine whether to segment the image file (step S210). It should be noticed that, a single image file is composed by multiple image segmented files. In order to perform the tolerance mechanism of the embodiment of the present disclosure successfully in multiple segments manner, the image file used for recovery may be segmented into multiple image segmented files. In other words, the segment module 112 may check whether one or more image files stored in the memory 110 are the image segmented files. In this embodiment, the segment module 112 may determine whether the image file is one of the image segmented files according to at least one of the number of the image file(s), name relationship of the image file(s), and a file size of each image file. For example, the segment module 112 may determine whether the number of the image file(s) is more than one, determine whether the name relationship of the image files has sequence relationship (such as number sequence (e.g., the file names respectively have 111, 112, 113, etc.), alphabet order (e.g., the file names respectively have a, b, c, etc.) relationships), and determine whether the size of each image file is less than or equal to a maximum size value (such as 50, 60, 100 megabytes (MB)) in order. If or only if one of the number, the name relationship and the file size of the image file is not conformed with any aforementioned condition, the segment module 112 would determine the image file is not the image segmented file (for example, it is a single image file, or multiple image segmented files with different file sizes). In addition, the segment module 112 may determine to segment the image file.

It should be noticed that, the aforementioned number, name relationship and file size is determined according to normal configuration rules of conventional image file segmenting application for the image segmented file. However, different file segmenting applications may have different configuration rules, the embodiments of the present disclosure would not limit the configuration rule, and the configuration rule may be adjusted depending on other image segmenting applications. In addition, the order to determine the number, the name relationship, and the file size is not limited as aforementioned examples, and the conditions can be modified, or the number of the conditions can be increased or decreased depending on actual requirement.

When segmenting the image file is determined, the segment module 112 may shrink the residual space of the memory 110 in which the image segmented files are stored. In should be noted that, in other embodiments, the segment module 112 may also determine whether the residual space is larger than or equal to the file size of the image file at first. If the aforementioned condition is conformed, the segment module 112 may omit to shrink the residual space. It means that, there has enough space in the recovery partition to store unsegmented image file and image segmented files. For example, the residual space is twice as large as the image file. On the other hand, of the aforementioned condition is not conformed, the residual space should be shrank.

For example, table (1) is an example illustrating disk partitions. The recovery partition in which the image file is stored is usually scheduled to be at the last disk partition (i.e., the fifth partition named as partition boot record (PBR) recovery partition), which may further record a downgrade right recovery partition. In addition, depending on actual requirement, the processor 150 may enlarge the space of the recovery partition through the shrink function, to use unused disk space.

last segmented file and the initial address of the image file. The continued segmenting address is determined based on formula (1):

$$SA=IMG\_Init\_Address+[Counter*(ImageTotalSize/DF)]*1024*1024*8 \quad (1),$$

wherein SA is the continued segmenting address, IMG_Init_Address is a physical initial address of the image file, Counter is the number of the last segmented file, IMG_Init_Address is the file size of the image size, and DF is a total segmenting number (i.e., the total number of the image segmented files segmented from one image file). The segment module 112 then can segment an unsegmented part of the image file according to the continued segmenting address.

For example, it is assumed that the initial address of the image file is 2500, the file size of the image file is 10 gigabytes (GB), and the total segmenting number is 200. An interruption occurs while the 85-th file being segmented (i.e., the number of the last segmented file is 85). The segment module 112 would use formula (1) (2500+[85*(10000 MB/200)]*1024*1024*8), to figure out that segmenting the image file would be started from the physical address 35651586500.

Because the embodiment of the present disclosure implements a multi-segment manner, after a segmenting exception situation occurs, the segment module 112 can merely continue from the physical address of image file, which is the continued segmenting address, while being interrupted. The

TABLE (1)

| | Disk | | | |
|---|---|---|---|---|
| First partition | Second partition | Third partition | Fourth partition | Fifth partition |
| Extensible Firmware Interface system partition (ESP) 100 MB | Microsoft reserved partition (MSR) 100 MB | OS | Data | PBR recovery partition |

If the memory 110, the recovery partition or other disk partitions has enough space to store the image segmented files, the segment module 112 may segment the image file into multiple image segmented files, and record a segmenting process (step S230). Specifically, during file segmenting procedure, the processor 150 records which image segmented file is being segmented through the counter 115. Each time the image file is segmented once, which may generate one image segmented file, a number of a last segmented file is accumulated. For example, if the segment module 112 segments three times, the number of the last segmented file would be recorded as three by the counter 115, and three image segmented files would be generated. The segment module 112 would make the number of the last segmented file as information of the segmenting process, and record the segmenting process in the log file 114. In addition, the segment module 112 may further store an initial address of the image file in the memory 110 (i.e., a physical address in the memory 110/disk) in the log file 114.

Then, in response to a segmenting exception situation (e.g., OS or application fail exception, power interruption, etc.), the segment module 112 may continue to segment the image file according to the segmenting process (step S250). In this embodiment, the segment module 112 may determine a continued segmenting address based on the number of the image segmented files completely segmented from the image file can remain in the memory 110. The processor 150 does not have to restart from the initial address of the image file.

It should be noted that, the aforementioned continued segmenting address can be determined each time the image file is segmented once or only in response to the segmenting exception situation. In addition, in some embodiments, the file sizes of some image segmented files may be different but these image segmented files may belonged to the same image file, the processor 150 may combine these image segmented files into a single image file first, and then the segment module 112 would segment the single image file.

On the other hand, the image file is segmented into segments with same file size in conventional manner, so that the file size of one image segmented file may be different from other image segmented files, and the subsequent recovery operation may be affected. In order to make the file sizes of all image segmented files are the same with each other, the embodiment of the present disclosure may determine the total segmenting number (e.g., 50, 100, 200, etc.) first, and then determine the file size of one image segmented file according to the total segmenting number. The total segmenting number is determined based on formula (2):

$$Split\_Size=Image\_Size/DF \quad (2),$$

wherein Split_Size is the size of one image segmented file, Image_Size is the size of the image file, and DF is the total segmenting number. The segment module 112 then determine whether the file size of one image segmented file is larger than a maximum size value (e.g., 50, 80, 150 MB). If the file size of one image segmented file is larger than the maximum size value, the segment module 112 may increase the total segmenting number (for example, increase 50, 100, 150 MB) and determine the file size of one image segmented file again. If the file size of one image segmented file is not larger than the maximum size value, the segment module 112 may segment the image file according to the file size of one image segmented file.

For example, if the segment module 112 determines that the file size of one image segmented file is larger than 500 MB, the parameter DF (i.e., the total segmenting number) would plus 100 MB. The file size of one image segmented file would be determined again according to new parameter DF until the file size of one image segmented file is less than or equal to 50 MB. It is assumed that, the file size of the image file is 8452 MB, the total segmenting number DF would be determined as 200 based on formula (2) because the size of one image segmented file Split_Size is 42.26 MB (less than 50 MB). The size of one image segmented file Split_Size is larger than 50 MB if the total segmenting number DF is 100, so that the total segmenting number DF would not be 100.

It should be noted that, here, the maximum size value is the same as the maximum size value used to determine the single image file. However, in other embodiments, these two values may be different. In addition, the total segmenting number of the formula (2) can be provided to the formula (1) or could be different from the formula (1).

Furthermore, in one embodiment, in order to use the space of the memory 110 effectively, after the segmenting phase is completed (i.e., the number of the last segmented file equals to the total segmenting number), the segment module 112 may delete the original image file to release the space. However, in other embodiments, the segment module 112 may keep the original image file in the memory 110.

If the segmenting phase is completed or not to segment the image file is determined in step S210 (i.e., the number, name relationship and file sizes of these image files are conformed with the conditions, these image files would be considered as image segmented files). Then, referring to FIG. 3, which is a flow chart of a fault tolerance processing method-file restoring phase according to an embodiment of the present disclosure, the restore module 113 may restore the image segmented files sequentially and record a restoring process (step S310). Specifically, during the image file recovery procedure, the processor 150 may record which image segmented file is being restored through the counter 115. Each time one image segmented file is restored, a number of a last segmented file is accumulated. For example, the restore module 113 restore the fifth image segmented file, and the counter 155 record the number of the last restored file as five. The restore module 113 may determine the number of the last restored file as information of the restoring process, and the restoring process is recorded in the log file 114.

Figure 3:
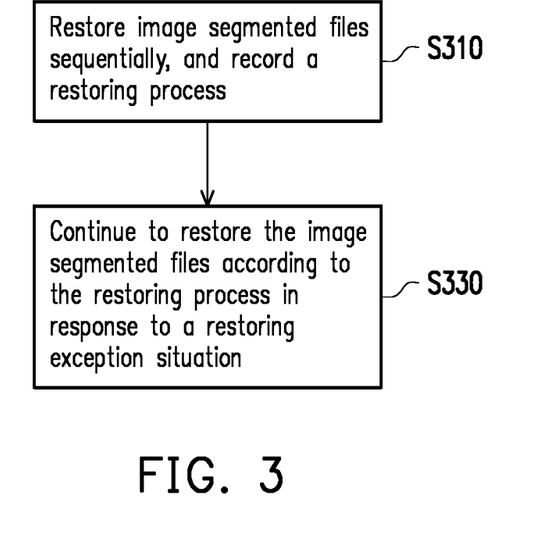
FIG. 3 is a flow chart of a fault tolerance processing method-file restoring phase according to an embodiment of the present disclosure.

Then, in response to a restoring exception situation (such as OS or application fail exception, power interruption, etc.), the restore module 113 can continue to restore an unrestored part of the image segmented files according to the restoring process (step S350). In this embodiment, the number of the last restored file represents how many image segmented files is restored successfully. The restore module 113 can merely start to restore from the next image segmented file (which has an order as the number of the last restored file plus one) without restarting from the first image segmented file.

It should be noted that, in some embodiments, the processor 150 may determine the name of each image segmented file according to a segmenting order of the segmenting phase, so that the file restoring phase can be based on the segmenting order to restore the image segmented file. Alternatively, the processor 150 may use an indicator or a parameter to record the order of the image segmented files, and the indicator or the parameter can be accessed by the restore module 113.

Table (2) is a benchmark by implementing the embodiments of the present disclosure. Taking 8 GB image file as an example, the file segmenting time (i.e., the processing time of segmented phase) is less than half of the recovery time, wherein the processing times such as a determination of recovery partition path or a start of the recovery may not excess three seconds.

TABLE (2)

|  | A CPU + HDD | I CPU + SSD |
|---|---|---|
| File segmenting time | 4 minutes | 1 minute |
| Restoring time | 37 minutes | 28 minutes |
| Total time | 41 minutes | 29 minutes |

When an exception occurs during recovery, a benchmark of the recovery time is showed in table (3) by implementing the embodiment of the present disclosure. During image recovery, the disk is formatted first, and then the image file would be installed in the disk. Therefore, without implementing the embodiments of the present disclosure (i.e., the conventional manner), if the recovery is interrupted, the image file should ne reinstalled again. The time spent on copying image file, loading image file, OS customized installation, and other deployment time is very long. After implementing the embodiments of the present disclosure, if the recovery is interrupted, the time of the whole procedure would be reduced. Taking hardware structure with A CPU and HHD as an example, if progress is interrupted at 60%, the subsequent recovery time would be 37-37*0.6=14.8 minutes.

TABLE (3)

|  | A CPU + HDD | I CPU + SSD |
|---|---|---|
| Subsequent recovery time (traditional manner) | 266 minutes (The deployment of the image file should be started: 10 minutes for copy, 98 minutes for loading image file, and 158 minutes for OS customized installation) | 182 minutes (The deployment of the image file should be started: 7 minutes for copy, 82 minutes for loading image file, and 93 minutes for OS customized installation) |

TABLE (3)-continued

| | A CPU + HDD | I CPU + SSD |
|---|---|---|
| Subsequent recovery time (implementing the embodiments of the present disclosure) | 37-37*current progress(%) | 28-28* current progress (%) |

Based on the two benchmarks, when comparing with the conventional manner, a short file segmenting time should be added in the manner by implementing the embodiments of the present disclosure. However, an exception situation occurs during recovery, the deployment of the image file would not need to restart again, thus the subsequent recovery time by implementing the embodiments of the present disclosure would be reduced significantly.

It should be noticed that, the aforementioned embodiments focus on segmenting and restoring image file. However, the deployment time of image file may also be affected by an exception. The following embodiments would be introduced to improve the deployment time.

Figure 4:
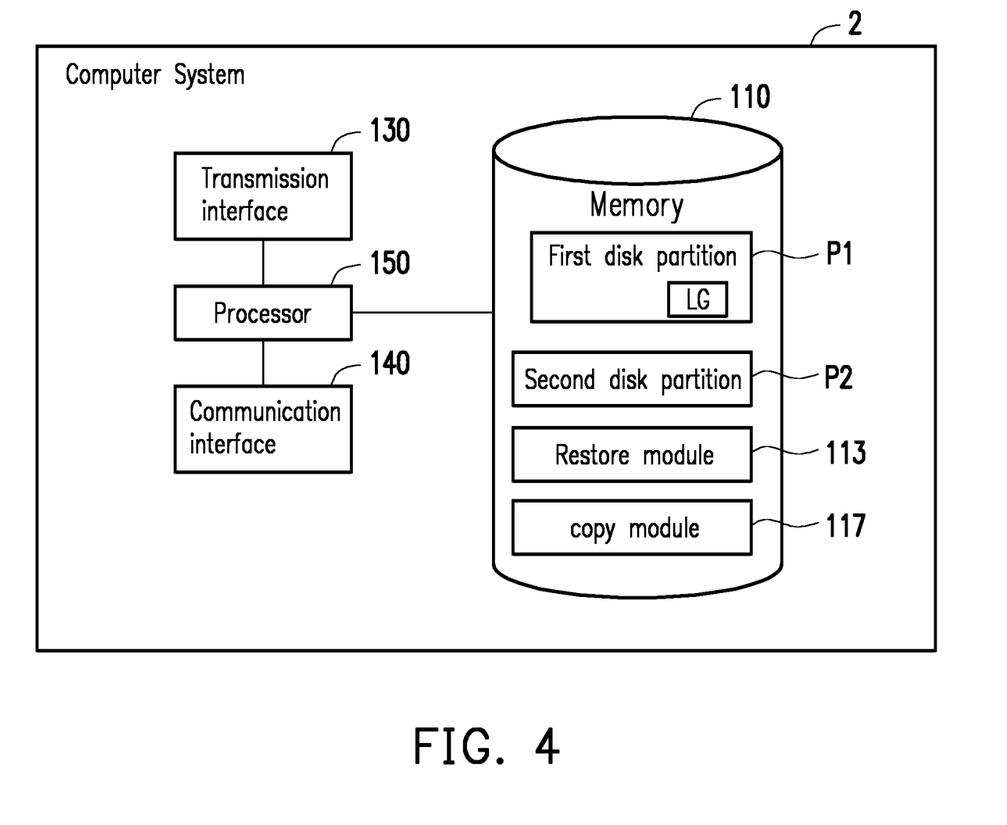
FIG. 4 is a block diagram illustrating a computer system according to an embodiment of the present disclosure.

FIG. 4 is a block diagram illustrating a computer system 2 according to an embodiment of the present disclosure. Referring to FIG. 4, when comparing with the embodiment of FIG. 1, the computer system 2 of this embodiment may further includes a transmission interface 130 and a communication interface 140. The transmission interface 130 could be, for example, a serial advanced technology attachment (SATA) interface, a universal serial bus (USB) interface, a multimedia card (MMC) interface, a parallel advanced technology attachment (PATA) interface, an institute of electrical and electronic engineers (IEEE) 1394 interface, a peripheral component interconnect (PCI) express interface, a secure digital (SD) interface, a memory stick (MS) interface, a compact flash (CF) interface, an integrated drive electronics (IDE) interface, or other compliant interfaces. In this embodiment, the transmission interface is used for receiving data from an external apparatus (such as a flash drive, a SD card, etc.).

The communication interface 140 could be, for example, a wireless network transceiver used for accessing Internet wirelessly or an Ethernet interface used for accessing Ethernet. In this embodiment, the communication interface 140 is used for communicating with an external apparatus (such as a server, a smart phone, etc.).

In addition, the memory 110 may further include a first disk partition P1, a second disk partition P2, and a copy module 117. The first disk partition P1 could be, for example, a recovery partition, and the second disk partition P2 could be, for example, an OS partition, but the disclosure is not limited thereto. The copy module 117 can be loaded by the processor 150, and the operation of the copy module 117 would be introduced later.

It should be noticed that, in this embodiment, the log file 114 may be recorded in a specific block of the first disk partition P1. The log file 114 may further record image file related files and any data for the deployment of the following embodiments. In other embodiments, the log file 114 may be stored in other address or other partitions, the disclosure is not limited thereto. The detailed contents of the log file 114 are explained in the following embodiments.

Figure 5:
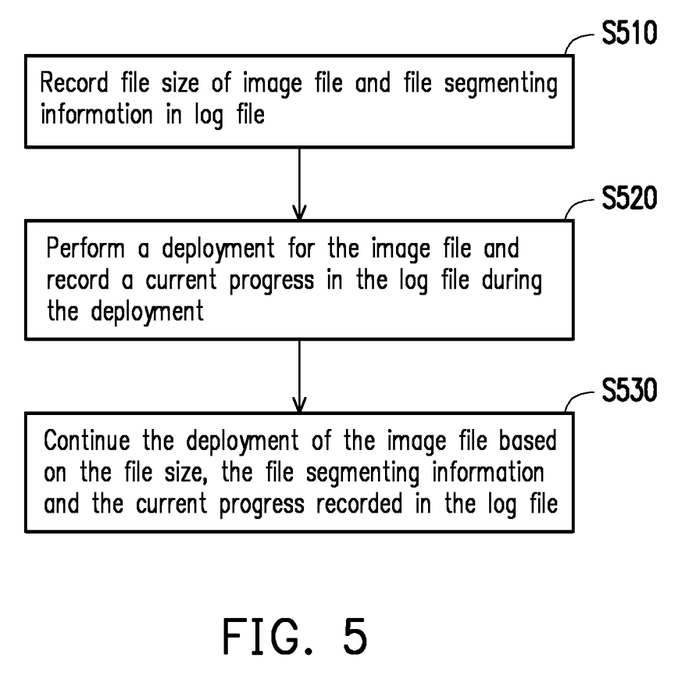
FIG. 5 is a flow chart of a fault tolerance processing method-deployment phase according to an embodiment of the present disclosure.

FIG. 5 is a flow chart of a fault tolerance processing method-deployment phase according to an embodiment of the present disclosure. Referring to FIG. 5, the processor 150 may record the file size of the one image file and file segmenting information in the log file 114 (step S510). Specifically, the image file is segmented into the image segmented files according to the file segmenting information. The file segmenting information is related to the segmenting process, and the file segmenting information may include a detailed information about how to segment the image into the image segmented files. For example, the file segmenting information includes at least one of the file size of one image segmented file, the file size of one image segmented file, the total segmenting number, etc.

Taking 4000 MB image file as an example, the image file would be segmented into 80 image segmented files with equal size. Accordingly, the processor 150 may, for example, record 4000 MB image file and 50 MB image segmented file as the segmenting information in the log file 114. However, the specific record format and record method for the log file 114 is not limited in the disclosure and could be modified according to actual requirement.

Taking 4820 MB image file as another example, the image file would be segmented into 97 image segmented files, wherein all file sizes of 96 image segmented files are 50 MB, and the file size of last image segmented file is 20 MB. Accordingly, the processor 150 may, for example, record 4820 MB image file and 50 MB image segmented file as the file segmenting information in the log file 114. Alternatively, the 4820 MB image file and all file sizes (e.g., 40 MB and 20 MB) of the image segmented files could be the file segmenting information.

Then, the restore module 113 may perform a deployment for the image file and recording a current progress during the deployment (step S520). The current progress represents a completed progress of the deployment while an error or an interruption occurring.

In one embodiment, the deployment of the image file includes two phases, which are a file copying phase and a file restoring phase in order. For example, during the file copying phase, the copy module 117 may copy multiple image segmented files of the image file sequentially from a media storing apparatus (e.g., a USB drive, a SD card, etc.) into the first disk partition P1 (e.g., the recovery partition) through the transmission interface 130, or download all image segmented files from a remoted terminal (e.g. a server, a workstation, etc.) through the communication interface 140. It means that, the image segmented file may not be segmented at the computer system 2. After all image segmented files are copied into the first disk partition P1, the file restoring phase is entered, and the restore module 113 would access the image segmented files sequentially from the first disk partition P1. Then, the restore module 113 restore the image segmented files into the second disk partition P2 (e.g., the OS disk partition). When a disconnection, power-off, or other trouble occurs and results in an error or an interruption, the processor 150 may record completed percentage of copying or restoring process as the current progress in the log file 114.

After trouble shooting of the deployment, the processor 150 may continue the deployment of the image file based on the file size of the image file, the file segmenting information, and the current progress (step S530).

In one embodiment, the processor 150 may determine which phase of the deployment encountered the error or the interruption first, and continue the deployment of the image file using different manners based on the file size of the image file, the file segmenting information, and the current progress without restarting the whole deployment.

In the following, different handle manner for different phases of the deployment according to the embodiments of the present disclosure would be introduced.

Figure 6:
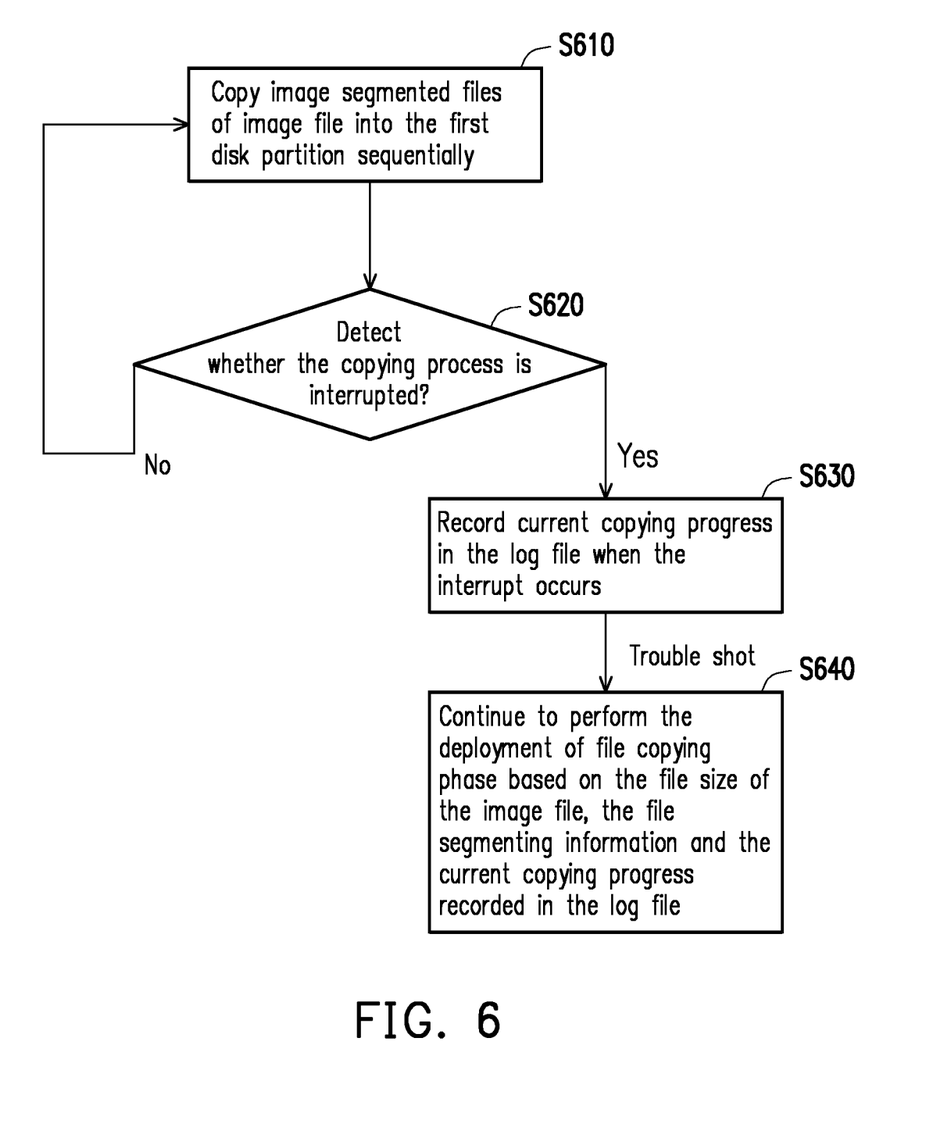
FIG. 6 is a flow chart of a fault tolerance processing method-file copying phase according to an embodiment of the present disclosure.

FIG. 6 is a flow chart of a fault tolerance processing method-file copying phase according to an embodiment of the present disclosure. Referring to FIG. 6, the copy module 117 may perform the deployment of the image file of file copying phase, and multiple image segmented files would be copied to the first disk partition P1 sequentially. The detailed description of the copy procedure of the image segmented file is introduced before, and the description would be omitted.

The copy module 117 may detect whether the copying process is interrupted (step S620). If the copying process is not interrupted, copying the image segmented files into the first disk partition P1 would be continued until all image segmented files is copied into the first disk partition P1. On the other hand, if the copying process is interrupted, the copy module 117 may record the current copying progress in the log file 114 in response to the interruption of the deployment occurring (step S630).

Then, after the trouble shooting of the interruption of the file copying phase, the copy module 117 may continue to perform the deployment of the file copying phase based on the file size of the image file, the file segmenting information, and the current progress. Specifically, the copy module 117 may determine which phase of the deployment encountered the interruption first. If the file copying phase encountered the interruption, copy module 117 may continue to perform the deployment of the file copying phase based on the file size of the image file, the file segmenting information, and the current progress recorded in the log file 114.

Taking a 4000 MB image file as an example, the file size 4000 MB of the image file and the file size 50 MB of one image segmented file are recorded in the log file 114. When an interruption occurs at 74% completed progress, the copy module 117 may determine the copy process should be started from which image segmented file according to formula (3) (step S640):

$$CF = \left\lceil T * \frac{P}{\text{Split\_Size}} \right\rceil, \quad (3)$$

wherein CF is a next beginning of image segmented files in the file copying phase of the deployment, T is the file size of the image file, P is a current copying progress (i.e., the current progress is related to the current copying progress in this embodiment), Split_Size is the size of one image segmented file, and ⌈ ⌉ is the ceil function to output an integer.

Based on the formula (3), the copy module 117 can obtain the next beginning of image segmented files CF, which is 60

$$\left(\text{i.e., } \left\lceil 4000 \text{ MB} * \frac{0.74}{50 \text{ MB}} \right\rceil \right).$$

Accordingly, the copy module 117 may continue copy the residual 21 image segmented files (i.e., the 60-th to 80-th image segmented files) into the first disk partition P1 from the 60-th image segmented file without restarting from the first image segmented file.

It should be noticed that, the disclosure does not limit the specific steps for copy procedure, and the steps can be modified according to the actual requirement. For example, the copy module 117 can use unzip command or copy command to direct to a certain address, to continue the copy phase from the certain address, but the embodiment of the present disclosure is not limited thereto.

Accordingly, the copy module 117 can copy all image segmented file into the first disk partition P1 without taking too much time according to the embodiment of FIG. 3. Then, the deployment of the image file would enter the file restoring phase.

Figure 7:
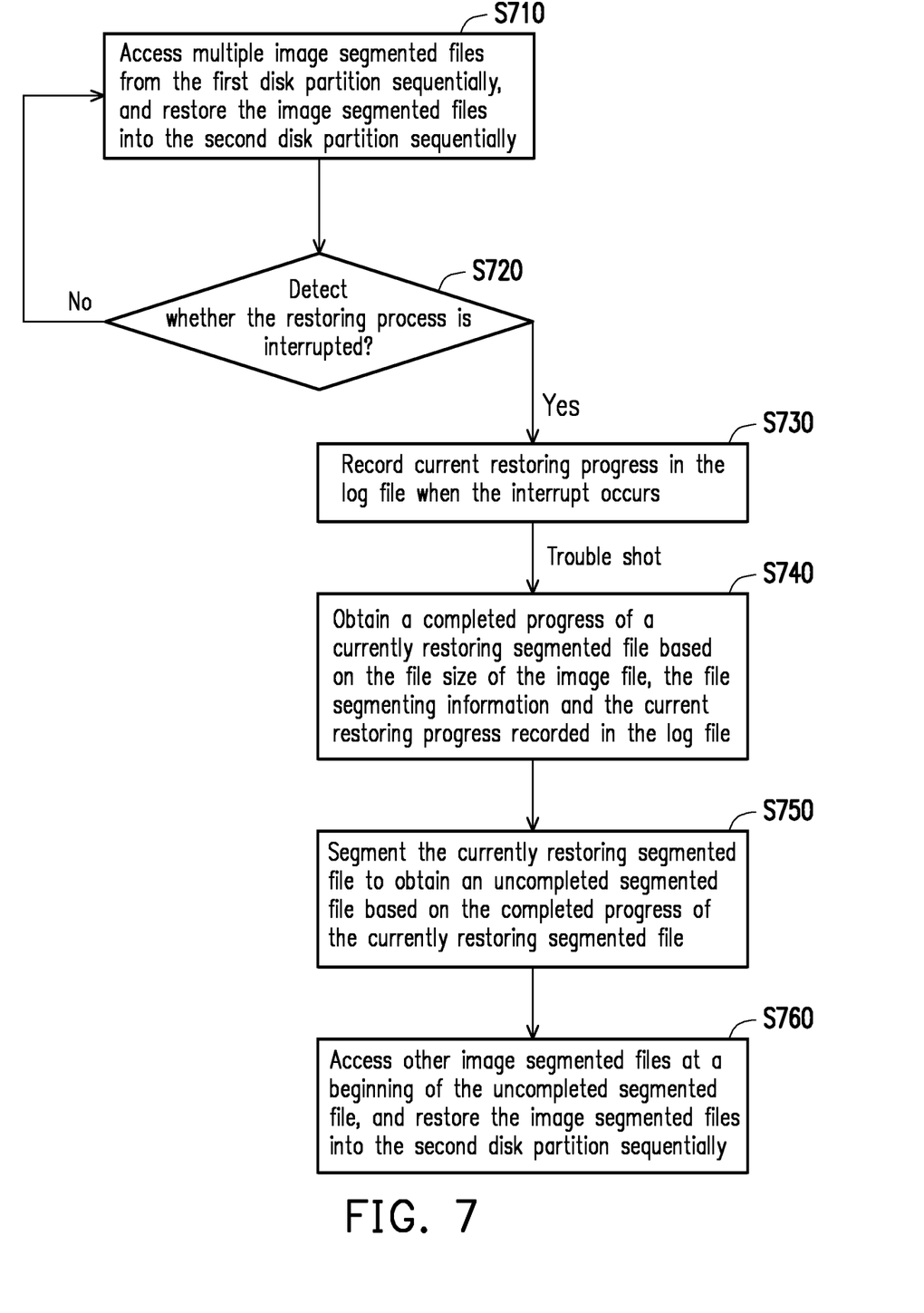
FIG. 7 is a flow chart of a fault tolerance processing method-file restoring phase according to an embodiment of the present disclosure.

FIG. 7 is a flow chart of a fault tolerance processing method-file restoring phase according to an embodiment of the present disclosure. Referring to FIG. 7, the restore module 112 may perform the file restoring phase of the deployment of the image, and the image segmented file would be accessed from the first disk partition P1 sequentially and restored into the second disk partition P2 sequentially (step S710).

In one embodiment, the restore module 113 may record an initial address of a currently restoring segmented file of the image segmented files in the first disk partition P1 into the log file 114. Specifically, when the restore module 113 starts to restore each image segmented file, the restore module 113 may record an initial address of the currently restoring segmented file in the log file 114. Accordingly, the restore module 113 can obtain the initial address of the currently restoring segmented file quickly without calculation.

Then, the restore module 113 may detect whether the restoring process is interrupted (step S720). If the restoring process is not interrupted, restoring the image segmented files into the second disk partition P2 would be continued until all image segmented files is restored to the second disk partition P2 successfully. On the other hand, if the restoring process is interrupted, the processor 150 may record the current restoring progress in the log file 114 in response to the interruption of the deployment occurring (step S730). In this embodiment, the current progress is related to the current restoring progress.

After the trouble shooting of the interruption of the file restoring phase, the restore module 113 may continue to perform the deployment of the file restoring phase based on the file size of the image file, the file segmenting information, and the current progress recorded in the log file 114.

Taking 4820 MB image file as an example, the file size 4820 MB of the image file and the segmenting size 50 MB of one image segmented file are recorded in the log file 114. When an interruption occurs at 99.9% completed progress, the restore module 113 may determine the current restoring progress according to formula (4) (step S740):

$$\text{PG\_fail} = \text{Split\_Size} * \left\lfloor T * \frac{P'}{\text{Split\_Size}} \right\rfloor, \quad (4)$$

wherein PG_fail is the completed progress of a currently restoring segmented file (i.e., how many size of the currently restoring segmented file has be completely restored, and current progress is further related to the completed progress in this embodiment), T is the size of the image file, P' is the current restoring progress, and Split_Size is the segmenting size for one image segmented file, and { } is the fractional part function to output a fractional part.

Based on the formula (4), the restore module 113 can obtain the completed progress PG_fail is 15180 KB $$\left(i.e., 50 \text{ MB} * \left\{4820 \text{ MB} * \frac{0.9999}{50 \text{ MB}}\right\}\right).$$

It means that, the restore module 113 has restored 15180 KB of the currently restoring segmented file into the second part disk partition P2.

The restore module 113 may segment the currently restoring segmented file to obtain an uncompleted segmented file in the currently restoring segmented file based on the completed progress of the currently restoring segmented file and the result of the formula (4) (step S750). Then, the restore module 113 may continue to access the image segmented files at a beginning of the uncompleted segmented file, and restore the image segmented files into the second disk partition P2 sequentially (step S760).

In one embodiment, the restore module 150 may determine the currently restoring segmented file based on a formula similar to the formula (3), and segment the currently restoring segmented file to obtain the uncompleted segmented file in the currently restoring segmented file according to the currently restoring segmented file and the completed progress thereof. For example, the restore module 113 determines the currently restoring segmented file is 97

$$\left(i.e., \left\lceil 4820 \text{ MB} * \frac{0.999}{50 \text{ MB}} \right\rceil\right)$$

based on a formula similar to the formula (3). Then, the segment module 112 may segment the 97-th image segmented file into a completed segmented file and an uncompleted segmented file. The completed segmented file of the 97-th image segmented file is first 15180 bytes, and the uncompleted segmented file is last 4820 bytes. Accordingly, the restore module 113 can continue to restore the image segmented files from a beginning of the uncompleted segmented file without starting from the first image segmented file.

Based on the foregoing, by implementing the computer system and the fault tolerance processing method thereof of image file of the present disclosure, the image file would be segmented, copied, accessed and restored in segments. The segmenting, copying and restoring processes would be recorded, so that the segmenting and deployment operation can be continued in response to any exception occurring. Accordingly, the efficiency and successful rate can be improved. In addition, the file size of the image segmented files could be the same, so that the subsequent restoring operation would be performed successfully.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A fault tolerance processing method of image file, adapted for a computer system, and the fault tolerance processing method comprising:
   determining whether to segment at least one image file for disk partition recovery;
   segmenting the at least one image file into a plurality of image segmented files sequentially and recording a segmenting process in response to determining to segment the at least one image file, wherein the segmenting process is related to a number of a last segmented file, and each time the at least one image file is segmented once, the number of the last segmented file is accumulated; and
   continuing to segment the at least one image file according to the segmenting process in response to a segmenting exception situation occurring at segmenting of the last segmented file, comprising:
      determining a continued segmenting address based on the number of the last segmented file and an initial address of the at least one image file in a memory, wherein the initial address and the continued segmenting address are two of physical addresses in the memory, the continued segmenting address is related to a summation of the initial address and a product of the number of the last segmented file and a file size of one of the image segmented files; and
      segmenting an unsegmented part of the at least one image file from the continued segmenting address.

2. The fault tolerance processing method of image file according to claim 1, wherein the step of determining whether to segment the at least one image file comprises:
   determining whether the at least one image file is one of the image segmented files according to at least one of the number of the at least one image file, name relationship of the at least one image file, and a file size of the at least one image file; and
   determining to segment the at least one image file in response to the at least one image file being not one of the image segmented files.

3. The fault tolerance processing method of image file according to claim 1, wherein after the step of determining whether to segment the at least one image file, the fault tolerance processing method further comprises:
   determining the file size of one of the image segmented files according to a total segmenting number, wherein the at least one image file is composed by the image segmented files;
   determining whether the file size of the one of the image segmented files is larger than a maximum size value;
   increasing the total segmenting number and determining the file size of one of the image segmented files again in response to the file size of one of the image segmented files being larger than the maximum size value; and
   segmenting the at least one image file according to the file size of one of the image segmented files in response to the file size of one of the image segmented files being not larger than the maximum size value.

4. The fault tolerance processing method of image file according to claim 1, wherein before the step of determining whether to segment the at least one image file, the fault tolerance processing method further comprises:
   shrinking residual space of the computer system in which the image segmented files are stored.

5. The fault tolerance processing method of image file according to claim 1, wherein after the step of determining whether to segment the at least one image file, the fault tolerance processing method further comprises:
  determining the at least one image file as one of the image segmented files in response to not segmenting the at least one image file;
  restoring the image segmented files sequentially and recording a restoring process, wherein the restoring process is related to a number of a last restored file, and each time one of the image segmented files is restored, the number of the last restored file is accumulated; and
  continuing to restore an unrestored part of the image segmented files according to the restoring process in response to a restoring exception situation.

6. The fault tolerance processing method of image file according to claim 1, further comprising:
  recording a file size of the at least one image file and file segmenting information, wherein the at least one image file is segmented into the image segmented files according to the file segmenting information, and the file segmenting information is related to the segmenting process;
  performing a deployment for the at least one image file and recording a current progress during the deployment; and
  continuing the deployment of the at least one image file based on the file size of the at least one image file, the file segmenting information, and the current progress in response to an interruption of the deployment occurring.

7. The fault tolerance processing method of image file according to claim 6, wherein the current progress is related to a current copying progress, and the step of performing the deployment for the at least one image file and recording the current progress during the deployment comprises:
  copying the image segmented files into a first disk partition sequentially; and
  recording the current copying progress in response to the interruption of the deployment occurring.

8. The fault tolerance processing method of image file according to claim 6, wherein the current progress is related to a current restoring progress, and the step of performing the deployment for the at least one image file and recording the current progress during the deployment comprises:
  accessing the image segmented files from a first disk partition sequentially, and restoring the image segmented files into a second disk partition sequentially; and
  recording the current restoring progress in response to the interruption of the deployment occurring.

9. The fault tolerance processing method of image file according to claim 8, wherein the step of performing the deployment for the at least one image file and recording the current progress during the deployment further comprises:
  recording an initial address of a currently restoring segmented file of the image segmented files in the first disk partition.

10. The fault tolerance processing method of image file according to claim 8, wherein the current progress is related to a completed progress, and the step of continuing the deployment of the at least one image file based on the file size of the at least one image file, the file segmenting information and the current progress comprises:
  obtaining the completed progress of a currently restoring segmented file of the image segmented files based on the file size of the at least one image file, the file segmenting information and the current restoring progress;
  segmenting the currently restoring segmented file to obtain a uncompleted segmented file in the currently restoring segmented file based on the completed progress of the currently restoring segmented file; and
  continuing to access the image segmented files at a beginning of the uncompleted segmented file, and restoring the image segmented files into the second disk partition sequentially.

11. A computer system, comprising:
a memory, recording at least one image file; and
a processor, coupled to the memory, and configured for:
  determining whether to segment the at least one image file for disk partition recovery;
  segmenting the at least one image file into a plurality of image segmented files sequentially and recording a segmenting process in response to determining to segment the at least one image file, wherein the segmenting process is related to a number of a last segmented file, and each time the at least one image file is segmented once, the number of the last segmented file is accumulated; and
  continuing to segment the at least one image file according to the segmenting process in response to a segmenting exception situation occurring at segmenting of the last segmented file, wherein the processor is further configured for:
    determining a continued segmenting address based on the number of the last segmented file and an initial address of the at least one image file in the memory, wherein the initial address and the continued segmenting address are two of physical addresses in the memory, the continued segmenting address is related to a summation of the initial address and a product of the number of the last segmented file and a file size of one of the image segmented files; and
    segmenting an unsegmented part of the at least one image file from the continued segmenting address.

12. The computer system according to claim 11, wherein the processor is configured for:
  determining whether the at least one image file is one of the image segmented files according to at least one of the number of the at least one image file, name relationship of the at least one image file, and a file size of the at least one image file; and
  determining to segment the at least one image file in response to the at least one image file being not one of the image segmented files;
  determining not to segment the at least one image file in response to the at least one image being one of the image segmented files;
  restoring the image segmented files sequentially and recording a restoring process in response to determining not to segment the at least one image file, wherein the restoring process is related to a number of a last restored file, and each time one of the image segmented files is restored, the number of the last restored file is accumulated; and
  continuing to restore an unrestored part of the image segmented files according to the restoring process in response to a restoring exception situation.

13. The computer system according to claim 11, wherein the processor is configured for:

determining the file size of one of the image segmented files according to a total segmenting number, wherein the at least one image file is composed by the image segmented files;

determining whether the file size of the one of the image segmented files is larger than a maximum size value;

increasing the total segmenting number and determining the file size of one of the image segmented files again in response to the file size of one of the image segmented files being larger than the maximum size value; and segmenting the at least one image file according to the file size of one of the image segmented files in response to the file size of one of the image segmented files being not larger than the maximum size value.

14. The computer system according to claim 11, wherein the processor is configured for:

recording a file size of the at least one image file and file segmenting information, wherein the at least one image file is segmented into the image segmented files according to the file segmenting information, and the file segmenting information is related to the segmenting process;

performing a deployment for the at least one image file and recording a current progress during the deployment; and continuing the deployment of the at least one image file based on the file size of the at least one image file, the file segmenting information, and the current progress in response to an interruption of the deployment occurring.

15. The computer system according to claim 14, wherein the current progress is related to a current copying progress, and the processor is configured for:

copying the image segmented files into a first disk partition sequentially; and recording the current copying progress in response to the interruption of the deployment occurring.

16. The computer system according to claim 14, wherein the current progress is related to a current restoring progress, and the processor is configured for:

accessing the image segmented files from a first disk partition sequentially, and restoring the image segmented files into a second disk partition sequentially; and recording the current restoring progress in response to the interruption of the deployment occurring.

17. The computer system according to claim 16, wherein the processor is configured for:

recording an initial address of a currently restoring segmented file of the image segmented files in the first disk partition.

18. The computer system according to claim 16, wherein the current progress is related to a completed progress, and the processor is configured for:

obtaining the completed progress of a currently restoring segmented file of the image segmented files based on the file size of the at least one image file, the file segmenting information and the current restoring progress;

segmenting the currently restoring segmented file to obtain a uncompleted segmented file in the currently restoring segmented file based on the completed progress of the currently restoring segmented file; and continuing to access the image segmented files at a beginning of the uncompleted segmented file, and restoring the image segmented files into the second disk partition sequentially.

* * * * *